(12) United States Patent
Akin

(10) Patent No.: US 9,681,100 B2
(45) Date of Patent: Jun. 13, 2017

(54) METHODS, SYSTEMS, AND APPARATUS FOR PROVIDING VIDEO COMMUNICATIONS

(71) Applicant: eBay Inc., San Jose, CA (US)

(72) Inventor: Jeremiah Joseph Akin, Pleasant Hill, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/828,132

(22) Filed: Aug. 17, 2015

(65) Prior Publication Data

US 2015/0358585 A1 Dec. 10, 2015

Related U.S. Application Data

(63) Continuation of application No. 13/944,420, filed on Jul. 17, 2013, now Pat. No. 9,113,036.

(51) Int. Cl.
| | |
|---|---|
| *H04N 7/15* | (2006.01) |
| *H04N 7/14* | (2006.01) |
| *H04L 29/06* | (2006.01) |
| *G06F 3/01* | (2006.01) |
| *H04L 12/18* | (2006.01) |

(52) U.S. Cl.
CPC ............. *H04N 7/15* (2013.01); *G06F 3/013* (2013.01); *H04L 12/18* (2013.01); *H04L 12/1827* (2013.01); *H04L 65/403* (2013.01); *H04N 7/142* (2013.01)

(58) Field of Classification Search
CPC .......... H04N 7/15; H04L 65/403; G06F 3/013
USPC .. 348/14.07, 14.08, 14.09, 14.02, 14.16, 77, 348/14.01, 169, 207.1; 367/127; 381/92; 345/156, 473, 589; 351/159.03; 382/118; 455/411, 556.1; 700/259; 704/233, 243, 260; 713/182, 186; 463/36

See application file for complete search history.

(56) References Cited

U.S. PATENT DOCUMENTS

| | | | | |
|---|---|---|---|---|
| 6,072,522 | A | * | 6/2000 | Ippolito ................... H04N 7/15 348/14.1 |
| 6,409,596 | B1 | | 6/2002 | Hayashida et al. |
| 6,483,532 | B1 | * | 11/2002 | Girod ..................... H04N 7/147 348/14.12 |
| 6,593,956 | B1 | * | 7/2003 | Potts ..................... G01S 3/7865 348/14.09 |
| 6,690,618 | B2 | * | 2/2004 | Tomasi ..................... G01S 5/18 367/124 |
| 6,806,898 | B1 | | 10/2004 | Toyama et al. |
| 7,113,201 | B1 | * | 9/2006 | Taylor ..................... H04N 7/15 348/14.08 |
| 7,480,396 | B2 | | 1/2009 | Teiwes et al. |

(Continued)

OTHER PUBLICATIONS

"U.S. Appl. No. 13/944,420, Examiner Interview Summary mailed Jan. 26, 2015", 3 pgs.

(Continued)

*Primary Examiner* — Gerald Gauthier
(74) *Attorney, Agent, or Firm* — Schwegman, Lundberg & Woessner, P.A.

(57) ABSTRACT

Methods, systems, and apparatus for conducting a video conference. A location of a person is determined based on a direction of a source of speech. The location of an image capture device and/or a portion of a display device may be adjusted based on the determined direction of the source of speech.

20 Claims, 9 Drawing Sheets

(56) References Cited

U.S. PATENT DOCUMENTS

| | | | |
|---|---|---|---|
| 7,593,546 B2 | 9/2009 | Jouppi | |
| 8,150,063 B2* | 4/2012 | Chen | H04R 3/005 |
| | | | 381/122 |
| 8,194,093 B2* | 6/2012 | Perlman | G06K 9/00255 |
| | | | 345/420 |
| 8,218,899 B2 | 7/2012 | Yamazaki et al. | |
| 8,447,273 B1* | 5/2013 | Friedlander | H04M 1/72577 |
| | | | 382/115 |
| 8,582,836 B2 | 11/2013 | Niskanen et al. | |
| 8,638,498 B2 | 1/2014 | Bohn et al. | |
| 8,711,201 B2* | 4/2014 | Gorzynski | H04N 7/15 |
| | | | 348/14.01 |
| 8,845,099 B2 | 9/2014 | Clopton | |
| 8,913,103 B1* | 12/2014 | Sargin | G06K 9/00221 |
| | | | 348/14.12 |
| 9,077,974 B2* | 7/2015 | You | H04N 7/142 |
| 9,113,036 B2* | 8/2015 | Akin | H04N 7/15 |
| 2002/0161582 A1* | 10/2002 | Basson | G10L 21/06 |
| | | | 704/260 |
| 2003/0083872 A1* | 5/2003 | Kikinis | G10L 15/24 |
| | | | 704/243 |
| 2003/0090564 A1* | 5/2003 | Strubbe | H04N 7/142 |
| | | | 348/14.01 |
| 2005/0059488 A1* | 3/2005 | Larsen | A63F 13/10 |
| | | | 463/36 |
| 2006/0012601 A1* | 1/2006 | Francini | G06T 13/40 |
| | | | 345/473 |
| 2006/0224382 A1* | 10/2006 | Taneda | G10L 15/25 |
| | | | 704/233 |
| 2006/0288234 A1* | 12/2006 | Azar | G06F 21/32 |
| | | | 713/186 |
| 2007/0279482 A1* | 12/2007 | Oswald | H04N 7/142 |
| | | | 348/14.02 |
| 2008/0107311 A1 | 5/2008 | Huang et al. | |
| 2008/0166026 A1 | 7/2008 | Huang et al. | |
| 2009/0202114 A1* | 8/2009 | Morin | A63F 13/12 |
| | | | 382/118 |
| 2009/0278913 A1* | 11/2009 | Rosenfeld | H04N 7/144 |
| | | | 348/14.16 |
| 2009/0315974 A1* | 12/2009 | Matthews | H04N 7/144 |
| | | | 348/14.08 |
| 2009/0323981 A1* | 12/2009 | Cutler | H04N 7/142 |
| | | | 381/92 |
| 2010/0150406 A1* | 6/2010 | Xiao | G06K 9/00261 |
| | | | 382/118 |
| 2011/0090303 A1* | 4/2011 | Wu | G06K 9/00228 |
| | | | 348/14.16 |
| 2011/0292054 A1 | 12/2011 | Boker et al. | |
| 2012/0239196 A1* | 9/2012 | Olivier, III | B25J 9/1689 |
| | | | 700/259 |
| 2012/0281181 A1* | 11/2012 | Chen | G02C 7/04 |
| | | | 351/159.03 |
| 2012/0327176 A1* | 12/2012 | Kee | H04N 7/15 |
| | | | 348/14.08 |
| 2012/0327177 A1* | 12/2012 | Kee | H04N 7/15 |
| | | | 348/14.08 |
| 2013/0021459 A1* | 1/2013 | Vasilieff | G10L 25/78 |
| | | | 348/77 |
| 2013/0100008 A1* | 4/2013 | Marti | G06F 3/011 |
| | | | 345/156 |
| 2013/0113786 A1 | 5/2013 | King | |
| 2013/0190041 A1* | 7/2013 | Andrews | H04R 3/005 |
| | | | 455/556.1 |
| 2013/0201345 A1* | 8/2013 | Ling | H04N 7/144 |
| | | | 348/169 |
| 2013/0211387 A1 | 8/2013 | Riedel et al. | |
| 2014/0006794 A1* | 1/2014 | Odessky | G06F 21/36 |
| | | | 713/182 |
| 2014/0098174 A1* | 4/2014 | Summers | H04N 7/15 |
| | | | 348/14.1 |
| 2014/0200079 A1 | 7/2014 | Bathiche et al. | |
| 2014/0247368 A1* | 9/2014 | Chinn | H04N 5/23222 |
| | | | 348/207.1 |
| 2015/0022622 A1* | 1/2015 | Akin | H04N 7/15 |
| | | | 348/14.08 |
| 2015/0358585 A1* | 12/2015 | Akin | H04N 7/15 |
| | | | 348/14.08 |

OTHER PUBLICATIONS

"U.S. Appl. No. 13/944,420, Non Final Office Action mailed Dec. 26, 2014", 7 pgs.

"U.S. Appl. No. 13/944,420, Notice of Allowance mailed Apr. 13, 2015", 8 pgs.

"U.S. Appl. No. 13/944,420, Response filed Mar. 24, 2015 to Non Final Office Action mailed Dec. 26, 2014", 8 pgs.

Ashdown, Mark, et al., "Combining Head Tracking and Mouse Input for a GUI on Multiple Monitors", CHI 2005, (2005), 4 pgs.

Jacobs, Angelika, "Skype Eye Contact Finally Possible", [Online], Retrieved from the Internet: <URL: http://www.ethlife.ethz.ch/archive_articles/130827_blickkontakt-videokonferenzen_aj/index_EN>, (Aug. 27, 2013), 2 pgs.

Pece, Fabrizio, et al., "PanoInserts: Mobile Spatical Teleconferencing", CHI 2013, (2013), 10 pgs.

Sirkin, David, et al., "Motion and Attention in a Kinetic Videoconferencing Proxy", Interact'11 Proceedings of the 13th IFIP TC 13 international conference on Human-computer interaction—vol. Part I, (May 7, 2011), 162-180.

* cited by examiner

METHODS, SYSTEMS, AND APPARATUS FOR PROVIDING VIDEO COMMUNICATIONS

PRIORITY

This application is a continuation of and claims the benefit of priority to U.S. patent application Ser. No. 13/944,420, filed on Jul. 17, 2013, entitled "METHODS, SYSTEMS, AND APPARATUS FOR PROVIDING VIDEO COMMUNICATIONS," which is hereby incorporated by reference herein in its entirety.

TECHNICAL FIELD

The present application relates generally to image technologies, and more specifically, in one example, to providing video conferencing capabilities.

BACKGROUND

A wide variety of technologies have been developed for providing communications between users. Individuals may communicate over a variety of networks utilizing different types of media, including text, graphics, audio, still images, video images, and the like. The communications may be part of a video conferencing environment comprising both video and audio communications. In one example, two individuals may utilize a video conferencing system comprising a network and two video conferencing terminals. Each video conferencing terminal may be located in proximity to a user, or group of users, and may comprise an audio capture device, such as a microphone, to capture audio communications and an image capture device, such as a still or video camera, to capture image communications. The image communications may comprise one or more still images, or may comprise a video stream containing a plurality of images. The video conferencing environment may allow each individual participating in the conference call to view one or more other individuals who are participating in the conference call at one or more remote locations. The individuals may be viewed on a display device, such as a projector screen, a liquid crystal delay, a video monitor, a television set, a computer monitor, and the like. As an individual is viewing a conference participant on a display device, an image of the individual may be captured and transferred to another video conferencing terminal. Since the individual may be staring toward the display device of the video conferencing terminal when the image is captured, the image captured by the camera may be at an angle to the individual's face such that the individual may appear to be staring away from the image capture device. A viewer of the captured image may therefore be unable to make eye contact, or be unable to perceive making eye contact, with the individual represented in the image.

BRIEF DESCRIPTION OF THE DRAWINGS

Some embodiments are illustrated by way of example and not limitation in the figures of the accompanying drawings in which.

DETAILED DESCRIPTION

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, systems, and apparatus for providing video communications are described. In one example embodiment, two or more individuals may conduct a video conference via a network. A video conferencing terminal may be located in proximity to each individual or to a collocated group of individuals. Each video conferencing terminal may comprise one or more of: an audio capture device, an image capture device, a display device for displaying still and/or video images, a speaker or other device for playing audio signals, a communication controller and a network interface. The audio capture device may comprise a microphone or similar device. The image capture device may comprise a video camera or similar device.

The video conferencing terminal may allow each individual participating in the conference call to view and/or hear one or more other individuals participating in the conference call at one or more remote locations. As an individual is viewing the display device, an image of the individual may be captured by the image capture device and transferred to one or more remote video conferencing terminals. In one example embodiment, the video conferencing terminal may be configured to capture an image of an individual who is viewing a display device such that the individual appears to be staring toward the image capture device.

Figure 1:
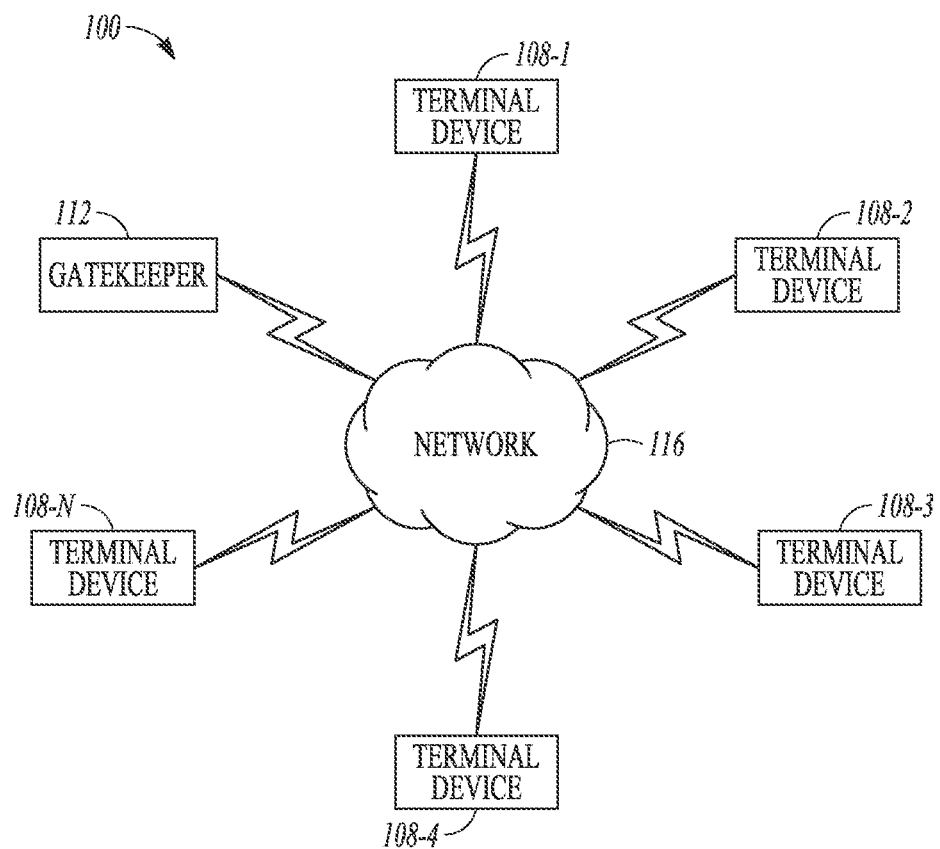
FIG. 1 is a block diagram of an example system, in accordance with an example embodiment, for providing video conferencing between two or more individuals or groups of individuals.

FIG. 1 is a block diagram of an example system, in accordance with an example embodiment, for providing video conferencing between two or more individuals or groups of individuals. In one example embodiment, the system 100 may comprise one or more video conferencing terminal devices 108-1, 108-2, 108-3, and 108-N (terminal devices 108 hereinafter), a gatekeeper 112, and a network 116. Each terminal device (e.g., 108-1) may comprise a personal computer (PC), a cellular phone, a personal digital assistant (PDA), or any other appropriate computer device. Each terminal device (108-1, 108-2 or 108-N) may include a capture and display apparatus 300 for capturing and displaying images of individuals participating in a video conference, as described more fully below in conjunction with FIG. 3A, and may comprise a control and communication apparatus 400 for controlling the capture of video images and audio signals, and for communicating the captured media content over a network, as described more fully below in conjunction with FIG. 4. In one example embodiment, the terminal device 108-1 may comprise a user interface program. Although a detailed description is only illustrated for terminal device 108-1, it is noted that each of the other terminal devices (e.g., terminal device 108-2 through terminal device 108-N) may have corresponding elements with the same functionality.

The gatekeeper 112 may, for example, provide a registry for terminal devices 108 and may perform address resolution for a video conference connection request.

The network 116 may be a local area network (LAN), a metropolitan area network (MAN), a wide area network (WAN), a wireless network, a network of interconnected networks, the public switched telephone network (PSTN), and the like.

Figure 2:
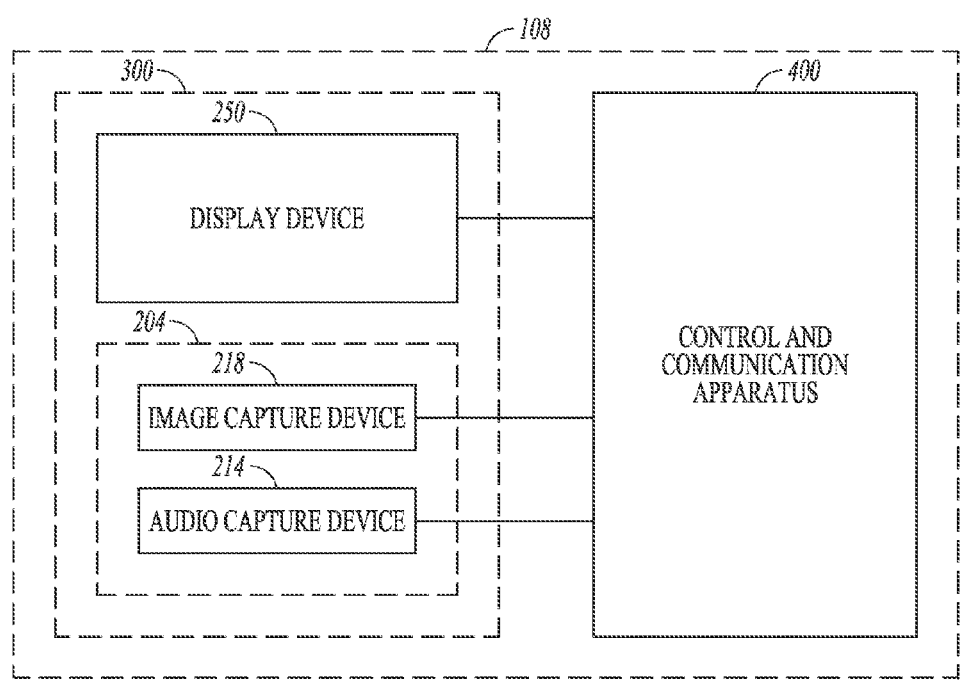
FIG. 2 is a block diagram of an example terminal device, in accordance with an example embodiment, for providing video conferencing capabilities to one or more individuals.

FIG. 2 is a block diagram of an example terminal device 108, in accordance with an example embodiment, for providing video conferencing capabilities to one or more individuals participating in a video conference. As described above, each terminal device (108-1, 108-2 or 108-N) may include a capture and display apparatus 300 for displaying and capturing images of one or more individuals participating in a video conference, as described more fully below in conjunction with FIG. 3A, and may comprise a control and communication apparatus 400 for controlling the capture of media content, and communicating the media content over a network 116, as described more fully below in conjunction with FIG. 4. The capture and display apparatus 300 and the control and communication apparatus 400 may be located in the same enclosure, or may be located in different enclosures. The capture and display apparatus 300 may comprise a media capture device 204 and a display device 250. The media capture device 204 and the display device 250 may be located in a single enclosure, or may be split into multiple enclosures. The media capture device 204, the display device 250, and the capture and display apparatus 300 may communicate via one or more networks 116 and/or network links. The capture and display apparatus 300 and the control and communication apparatus 400 may communicate via one or more networks 116 and/or network links.

As described above, the capture and display apparatus 300 may be located in a single enclosure, or may be split into multiple enclosures. The capture and display apparatus 300 may comprise a media capture device 204 and a display device 250. Media capture device 204 may comprise an audio capture device 214 and may comprise an image capture device 218. The audio capture device 214 may be a microphone and the like. The image capture device 218 may be a still image camera, a video camera, and the like. In one example embodiment, a movement of the image capture device 218 may be controlled such that a viewer of display device 250 appears to be staring substantially directly at the image capture device 218. In one example embodiment, a movement of the display device 250 or a portion of the display device 250 may be controlled such that a viewer of display device 250 appears to be staring substantially directly at the image capture device 218. In one example embodiment, the motion of the image capture device 218 and/or a portion of the display device 250 may be controlled by the control and communication apparatus 400.

Figure 3A:
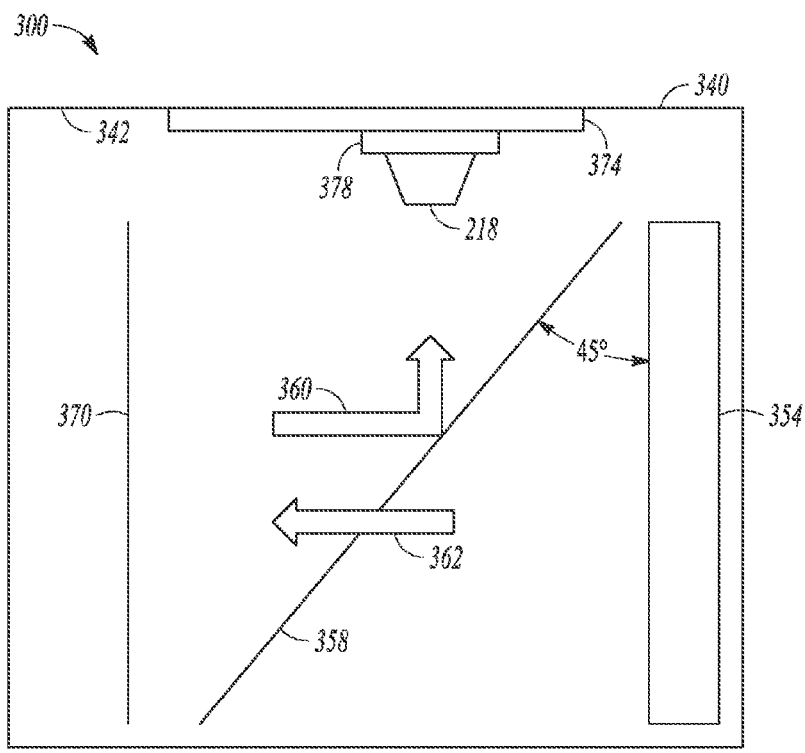
FIG. 3A is a schematic diagram of a first example of a capture and display apparatus for the example terminal device of FIG. 2, in accordance with an example embodiment, for displaying and capturing images of one or more individuals located in proximity to each other.

FIG. 3A is a schematic diagram of a first example capture and display apparatus 300, in accordance with an example embodiment, for capturing and displaying images, and capturing and playing audio signals of one or more individuals participating in a video conference. As described above, the capture and display apparatus 300 may comprise the media capture device 204 and the display device 250. The display device 250 may comprise an electronic screen 354. The electronic screen 354 may be, for example, a liquid crystal display (LCD). A glass pane 358 may be installed in front of the electronic screen 354. The glass pane 358 may be installed at a substantially 45 degree angle from the electronic screen 354. The glass pane 358 may be enhanced using known techniques to reflect light emitted in the direction of arrow 360 and may be enhanced using known techniques to pass light emitted in the direction of arrow 362. The image capture device 218 may be mounted in enclosure 340 as depicted in FIG. 3A to capture an image reflected by glass pane 358 (as depicted by arrow 360). An optional transparent, non-reflective screen 370 may be installed as depicted in FIG. 3A. An individual may view the electronic screen 354 through the optional non-reflective screen 370. The image capture device 218 may capture an image of the individual reflected by the glass pane 358.

Figure 3B:
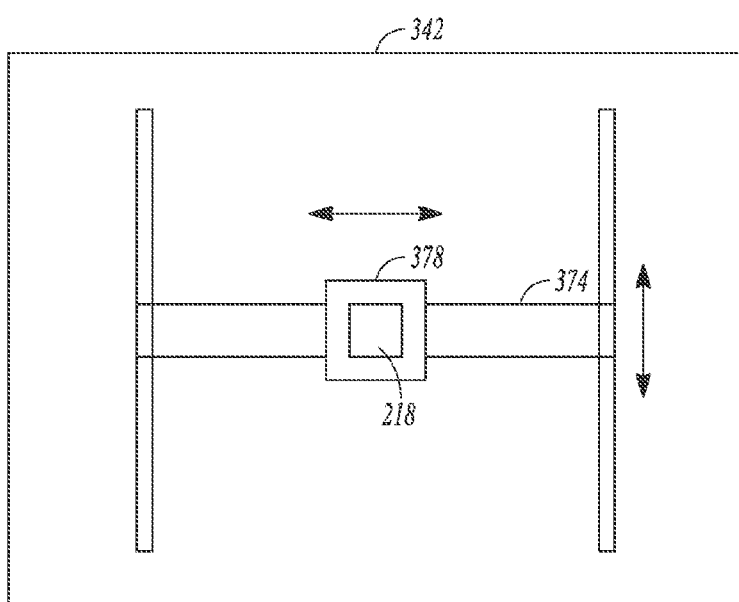
FIG. 3B is a schematic diagram of a top-side of the example capture and display apparatus of FIG. 3A, in accordance with an example embodiment.

FIG. 3B is a schematic diagram of a top-side 342 of the example capture and display apparatus 300, in accordance with an example embodiment. In one example embodiment, the image capture device 218 may be mounted on an optional image capture device carrier 378. The optional image capture device carrier 378 may be mounted on an optional track 374 such that the optional image capture device carrier 378 may be moved to a selected location on the surface of the top-side of enclosure 340. In one example embodiment, the optional track 374 enables the image capture device 218 to move in a single dimension. In one example embodiment, the optional track 374 enables the image capture device 218 to move in two dimensions. For example, the optional image capture device carrier 378 may be moved to a location identified by an x and y coordinate on the top-side 342 of enclosure 340.

Figure 3C:
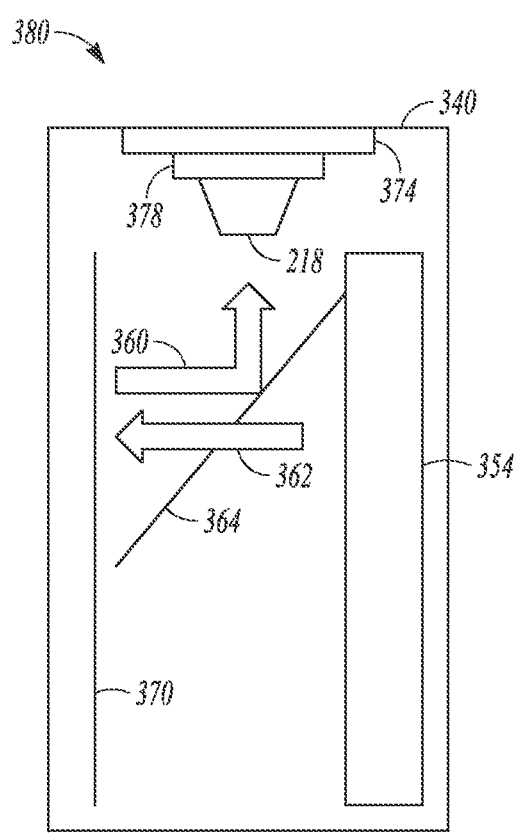
FIG. 3C is a schematic diagram of a second example of a capture and display apparatus for the example terminal device of FIG. 2, in accordance with an example embodiment, for displaying and capturing images of one or more individuals participating in a video conference.

FIG. 3C is a schematic diagram of a second example 380 of a capture and display apparatus 300, in accordance with an example embodiment, for capturing and displaying images, and capturing and playing audio signals of one or more individuals participating in a video conference. As described above, the capture and display apparatus 380 may comprise the media capture device 204 and the display device 250. The components of the capture and display apparatus 380 are similar to the components of the capture and display apparatus 300. The glass pane 364 of the capture and display apparatus 380 is smaller than the glass pane 358 of the capture and display apparatus 300 allowing for a slimmer enclosure 340. The glass pane 364 of the capture and display apparatus 380 may be mounted on one or more tracks (not shown in FIG. 3C) which enable the glass pane 364 to slide vertically in enclosure 340. The track for glass pane 364 may be similar to optional track 374 and may be vertically mounted on one horizontal sidewall of enclosure 340. In one example embodiment, the track for glass pane 364 may be similar to optional track 374 and may be vertically mounted on each of the two horizontal sidewalls of enclosure 340.

Figure 4:
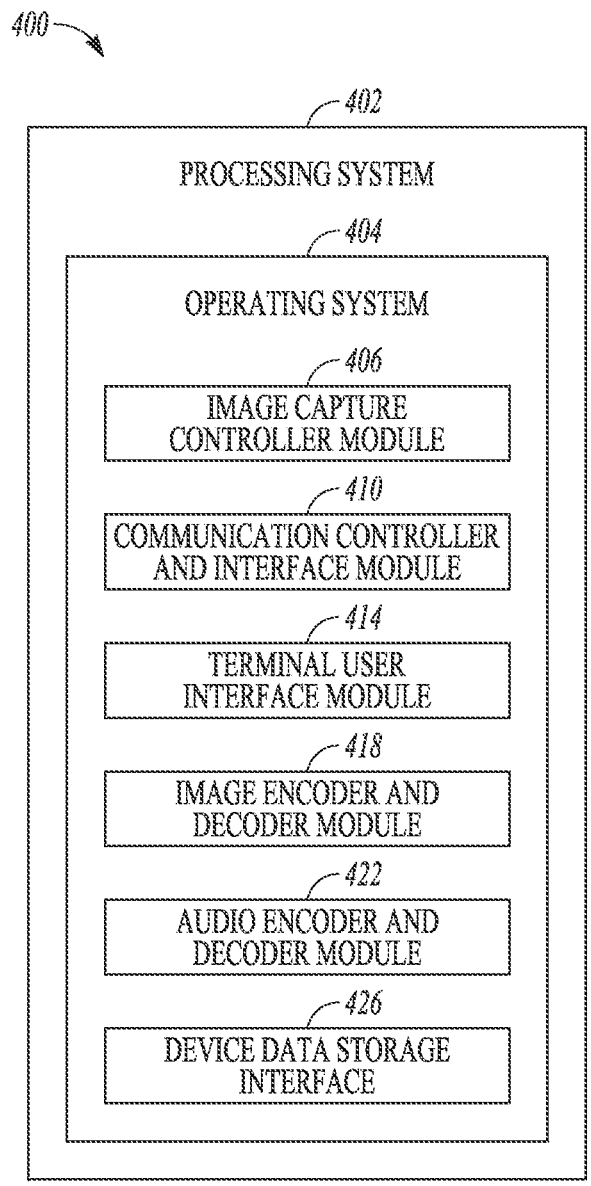
FIG. 4 is a block diagram of an example control and communication apparatus, in accordance with an example embodiment, for controlling the capture of images and audio signals, and for communicating the captured media content over a network.

FIG. 4 is a block diagram of an example control and communication apparatus 400, in accordance with an example embodiment, for controlling the capture of images and audio signals, and communicating the captured media content over a network. The control and communication apparatus 400 is shown to include a processing system 402 that may be implemented on a client or other processing device that includes an operating system 404 for executing software instructions.

In accordance with an example embodiment, the control and communication apparatus 400 may include an image capture controller module 406, a communication controller and interface module 410, a terminal user interface module 414, an image encoder and decoder module 418, and an audio encoder and decoder module 422. In accordance with an example embodiment, the control and communication apparatus 400 may further include a device data storage interface 426.

The image capture controller module 406 may identify the location of one or more sets of eyes in a captured image and may control the location of the electronic screen 354, the glass pane 358, 364, and/or the image capture device 218.

The communication controller and interface module 410 may transfer the captured still images or video to the network 116, may transfer the captured audio signal(s) to the network 116, may transfer still images or video received from the network 116 to the image encoder and decoder module 418, and may transfer audio signals received from the network 116 to the audio encoder and decoder module 422.

The terminal user interface module 414 may provide a user interface for establishing, controlling, executing, and terminating a video conference, as described below in conjunction with FIGS. 6 and 7.

The image encoder and decoder module 418 may compress and/or encode still images and/or video. The image encoder and decoder module 418 may also decode still images and/or video received from the network 116 and may display the decoded still images and/or video on the electronic screen 354.

The audio encoder and decoder module 422 may decode audio signals received from the network 116 and play the processed audio signals via a speaker system. The audio encoder and decoder module 422 may encode audio signals captured by audio capture device 214 and transfer the encoded audio to the network 116.

Figure 5:
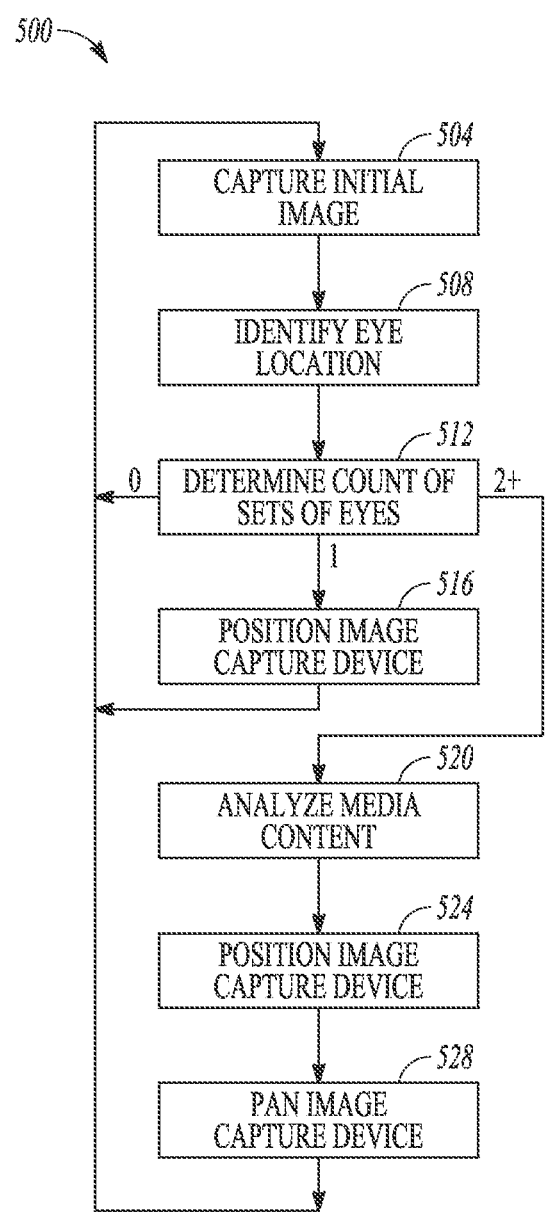
FIG. 5 is an example flowchart for a method for controlling the capture of still images and/or video images, in accordance with an example embodiment.

FIG. 5 is an example flowchart for a method 500 for controlling the capture of still images and/or video images, in accordance with an example embodiment. In one example embodiment, one or more of the operations of the method 500 may be performed by the image capture controller module 406.

In one example embodiment, an image of the user(s) may be captured (operation 504). The captured image may be analyzed to identify a location of one or more sets of eyes of one or more users in a known manner (operation 508). For example, the x and y coordinates of one or more sets of eyes in the captured image may be determined.

A test may be performed to determine a count of sets of eyes identified during operation 508 (operation 512). If the determined count equals zero, the method may proceed to operation 504. If the determined count equals one (indicating one individual is captured in the image), the method may proceed to operation 516. If the determined count equals two or more (indicating two or more individuals are captured in the image), the method may proceed to operation 520.

In one example embodiment, the image capture device 218 may be moved to a position based on the identified location of the set of eyes (operation 516). In one example embodiment, the image capture device 218 may be moved to the x and y coordinates of the identified location. In one example embodiment, the image capture device 218 may be moved to the x-coordinate of the identified location and to the y-coordinate that places the captured set of eyes substantially two-thirds of the distance from the bottom of the image toward the top of the image. In one example embodiment, the glass pane 364 may be moved to the x and y coordinates corresponding to the identified location. In one example embodiment, the glass pane 364 may be moved to the x-coordinate of the identified location and to the y-coordinate that places the captured set of eyes substantially two-thirds of the distance from the bottom of the image toward the top of the image. The method may then proceed to operation 504.

During operation 520, the captured image and/or captured audio is analyzed to determine the location of the individual who is currently speaking or who spoke last. The location of the individual who is currently speaking or who spoke last may be determined, for example, by analyzing the facial movements of each individual captured in the image in a known manner, and/or by analyzing a direction of the source of the speech in a known manner. For example, a plurality of microphones may be used to capture audio (including speech by the users) and the relative amplitude of each audio signal may be analyzed in a known manner to determine a direction of the audio source and thereby determine the user who is speaking. The method may then proceed to operation 524.

During operation 524, the image capture device 218 may be moved to a position based on the identified location of the sets of eyes. As described above in regard to operation 516, in one example embodiment, the image capture device 218 may be moved to the x and y coordinates of the identified location. In one example embodiment, the image capture device 218 may be moved to the x-coordinate of the identified location and to the y-coordinate that places the captured set of eyes substantially two-thirds of the distance from the bottom of the image toward the top of the image. In one example embodiment, the glass pane 364 may be moved to the x and y coordinates of the identified location.

In one example embodiment, the glass pane 364 may be moved to the x-coordinate of the identified location and to the y-coordinate that places the captured set of eyes substantially two-thirds of the distance from the bottom of the image toward the top of the image. The method may then proceed to operation 528.

During operation 528, the image capture device 218 may be panned toward the individual who is speaking or who last spoke. In one example embodiment, the image capture device 218 may be panned toward the individual who is speaking or who last spoke until the location of the set of eyes of the speaking individual is in the horizontal center of the captured image. The method may then proceed to operation 504.

In one example embodiment, the operations beginning at operation 504 may be repeated as the video conference progresses. For example, operations 504 to 516 or operations 504 to 528 may be repeated every second during the video conference. In one example embodiment, the changes to the x and y coordinates of the identified set(s) of eyes may be passed through a low pass filter in order, for example, to reduce the amount of motion of the image capture device 218, the portion of the display device 250, and/or glass pane 358, 364.

Figure 6:
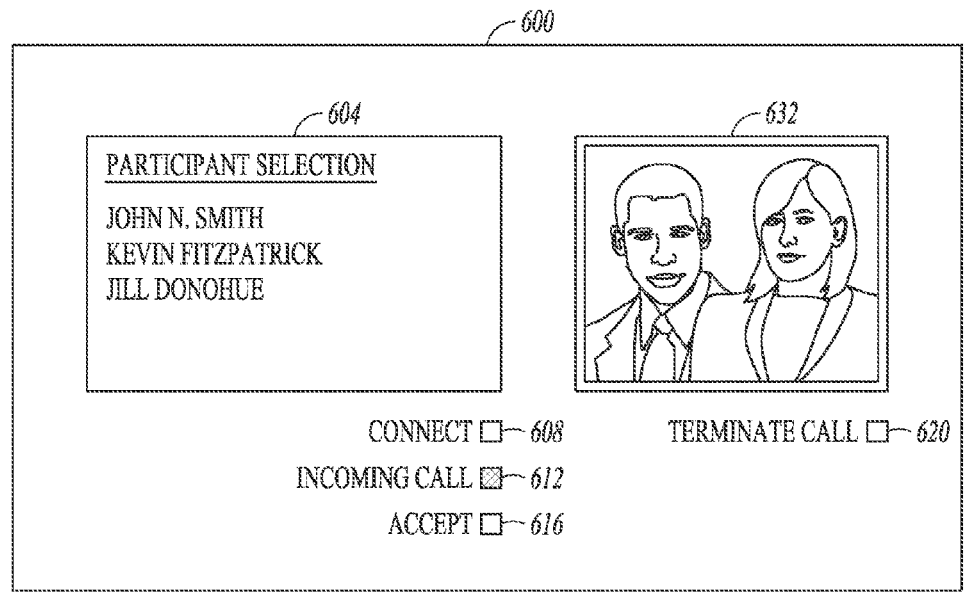
FIG. 6 is an example representation of a user interface for performing video conferencing, in accordance with an example embodiment.

FIG. 6 is an example representation of a user interface 600 for performing video conferencing, in accordance with an example embodiment. In one example embodiment, the user interface 600 may be provided by the terminal device 108-1 in conjunction with the terminal user interface module 414. The user interface 600 may comprise a conference participant selection field 604, a conference connection request radio button 608, an incoming call indicator 612, a conference connection acceptance radio button 616, and a conference connection termination radio button 620. An image display area 632 may display a copy of the image displayed on electronic screen 354.

Figure 7:
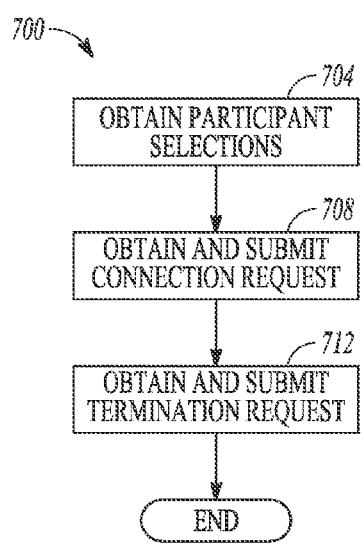
FIG. 7 is an example flowchart for a method for a video conferencing user interface, in accordance with an example embodiment.

FIG. 7 is an example flowchart for a method 700 for a video conferencing user interface, in accordance with an example embodiment. In one example embodiment, one or more of the operations of the method 700 may be performed by the terminal user interface module 414.

In one example embodiment, a user may initiate a video conference by selecting one or more conference participants via the conference participant selection field 604 and selecting the conference connection request radio button 608. The selections may be obtained during operation 704. A request to establish the video conferencing connection may be submitted to, for example, the communication controller and interface module 410 (operation 708). Upon establishment of the video conferencing connection, the video conference may be conducted and the video may be displayed on the display device 250. The user may terminate the video conference by selecting the conference connection termination radio button 620. In response to the user selecting the conference connection termination radio button 620, a request to terminate the video conferencing connection may be submitted to, for example, the communication controller and interface module 410 (operation 712).

In one example embodiment, an incoming request for a video conference may be indicated by incoming call indicator 612. The user may accept the incoming connection request by selecting the conference connection acceptance radio button 616. In response to the user selecting the conference connection acceptance radio button 616, a request to establish the video conferencing connection may be submitted to, for example, the communication controller and interface module 410 (operation 708). Upon establishment of the video conferencing connection, the video conference may be conducted and the video may be displayed on the display device 250. The user may terminate the video conference by selecting the conference connection termination radio button 620. In response to the user selecting the conference connection termination radio button 620, a request to terminate the video conferencing connection may be submitted to, for example, the communication controller and interface module 410 (operation 712).

Figure 8:
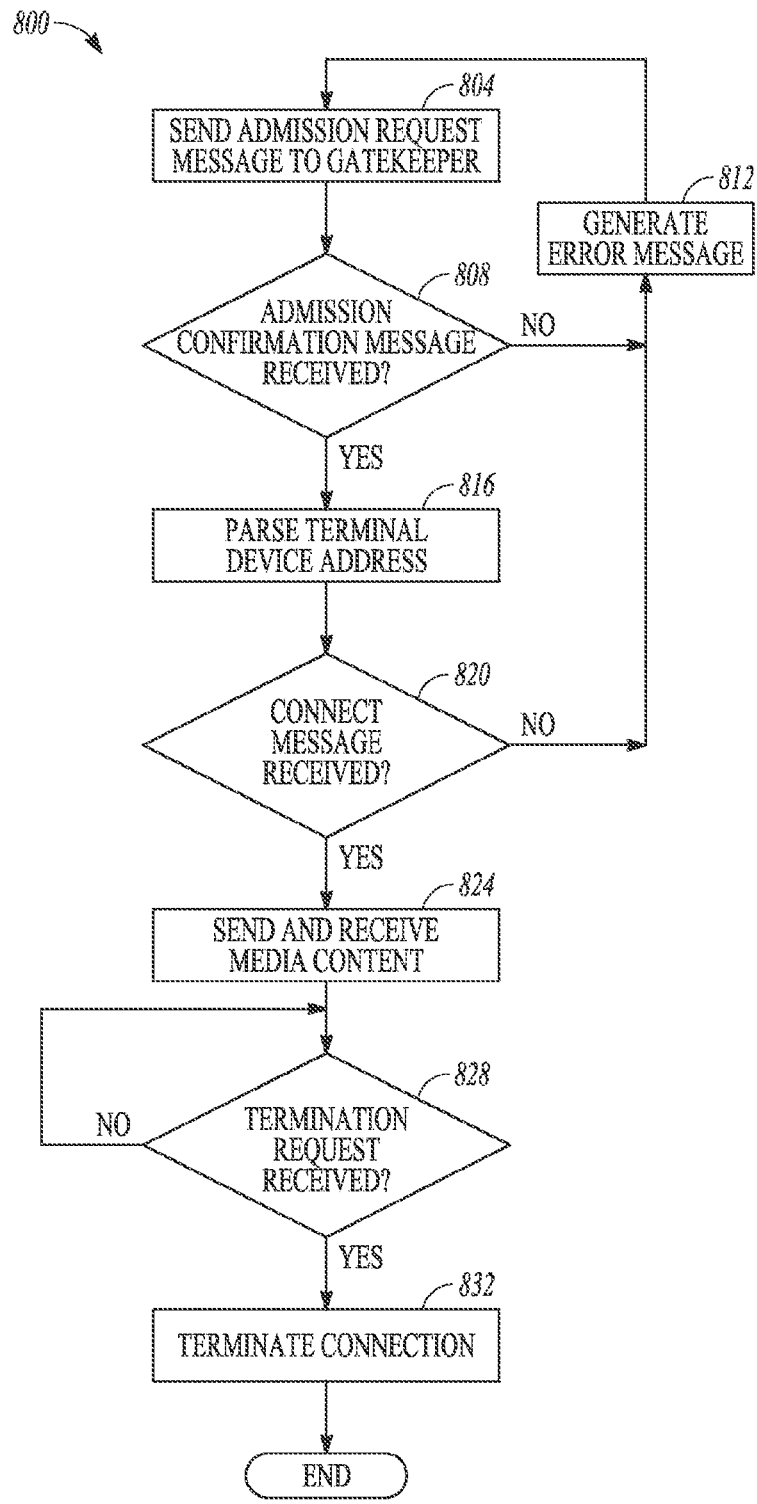
FIG. 8 is an example flowchart for a method for communicating media content over a network, in accordance with an example embodiment.

FIG. 8 is an example flowchart for a method 800 for communicating video images over a network, in accordance with an example embodiment. In one example embodiment, one or more of the operations of the method 800 may be performed by the communication controller and interface module 410.

In response to receiving a request to establish a video conferencing connection, an admission request message may be sent to the gatekeeper 112 with which the terminal device 108-1 is registered (operation 804). A test may be performed to determine if an admission confirm message is received from the gatekeeper 112 (operation 808). If an admission confirm message is not received within a predefined time period, an error message may be generated (operation 812) and the method may proceed to operation 804. If an admission confirm message is received within the predefined time period, the address of the remote terminal device 108-2 may be parsed from the admission confirm message and a setup request message may be sent to the remote terminal device 108-2 (operation 816). A test may be performed to determine if a connect message is received from the remote terminal device 108-2 (operation 820). If an admission confirm message is not received within a predefined time period, an error message may be generated (operation 812) and the method may proceed to operation 804. If an admission confirm message is received within the predefined time period, the transmission of the media content to the remote terminal device 108-2 and the reception of the media content from the remote terminal device 108-2 may be commenced (operation 824). A test may be performed to determine if a termination request has been received (operation 828). During the test operation (operation 828), the transmission of the media content to the remote terminal device 108-2 and the reception of the media content from the remote terminal device 108-2 may continue to be performed. In response to receiving a request to terminate the video conferencing connection, a connection termination message may be sent to the remote terminal device 108-2 (operation 832), and a session tear-down procedure may be performed in a known manner. The method may then end.

Although certain examples are shown and described here, other variations exist and are within the scope of the invention. It will be appreciated by those of ordinary skill in the art that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connects the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
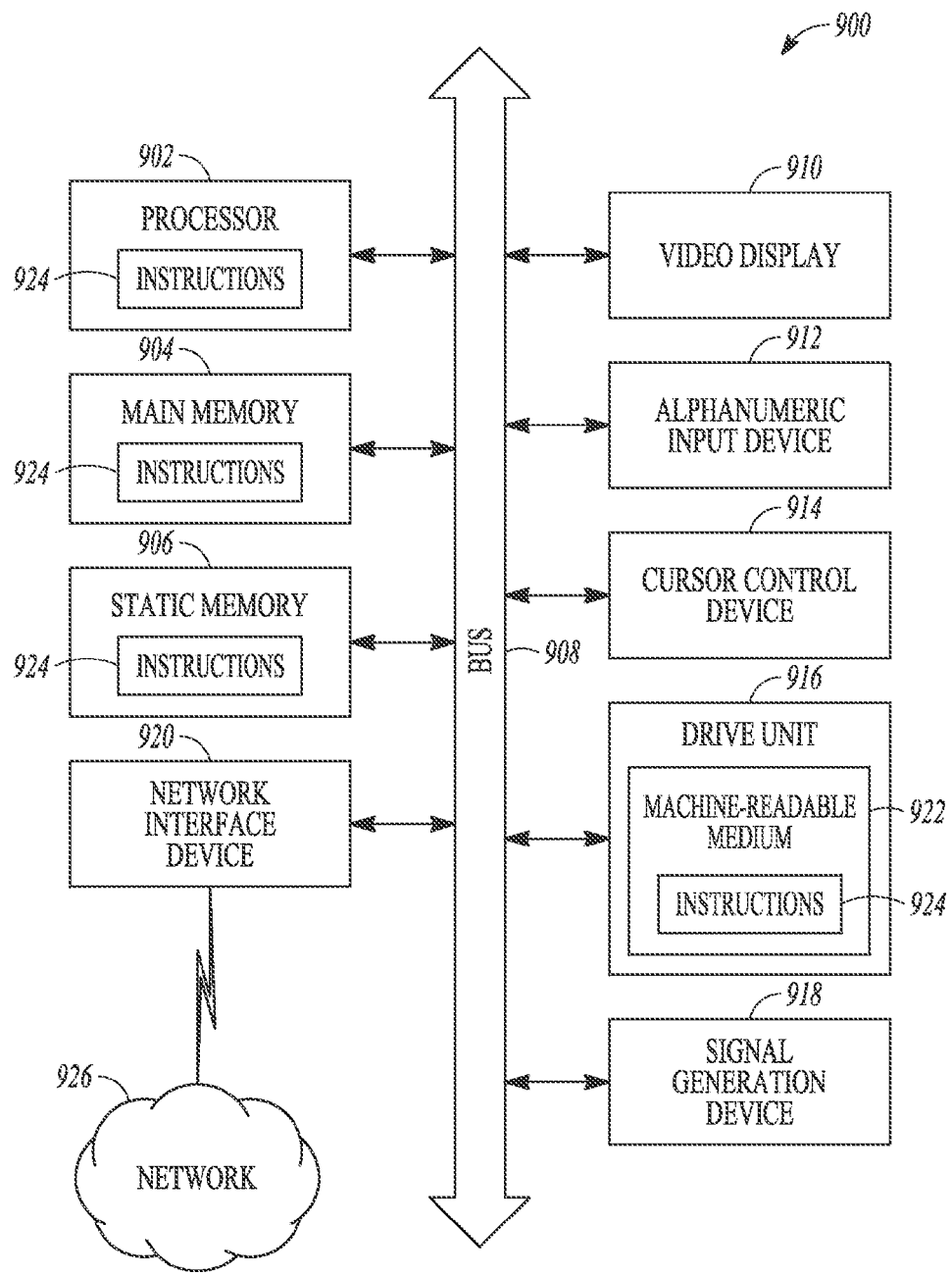
FIG. 9 is a block diagram of machine within which instructions may be executed for causing the machine to perform any one or more of the methodologies discussed herein.

FIG. 9 is a block diagram of a machine within which instructions may be executed for causing the machine to perform any one or more of the methodologies discussed herein. In one example embodiment, the machine may be the terminal device 108. In one example embodiment, the machine may be the control and communication apparatus 400. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. Instructions may also reside within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for conducting a video conference, the apparatus comprising:
   a processor;
   memory to store instructions that, when executed by the processor, cause the processor to perform operations comprising:
   analyzing one or more facial movements of a person captured by an image capture device to recognize that the person is speaking, and
   adjusting an orientation of the image capture device in response to the facial movement analysis recognizing that the person is speaking.

2. The apparatus of claim 1, wherein the operations further comprise determining the location of the person by analyzing audio received by one or more microphones.

3. The apparatus of claim 1, wherein the operations further comprise determining a location of the person based on a location of a set of eyes in an image.

4. The apparatus of claim 1, wherein the operations further comprise panning the image capture device toward the person.

5. The apparatus of claim 3, wherein the adjusting adjusts a location of the image capture device.

6. The apparatus of claim 1, wherein the adjusting adjusts a location of a portion of a display device.

7. The apparatus of claim 1, wherein the adjusting adjusts a location of a reflective element.

8. A method for conducting a video conference, the method comprising:
   analyzing one or more facial movements of a person captured by an image capture device to recognize that the person is speaking; and
   adjusting an orientation of the image capture device in response to the facial movement analysis recognizing that the person is speaking.

9. The method of claim 8, further comprising determining the location of the person by analyzing audio received by one or more microphones.

10. The method of claim 8, further comprising determining the location of the person based on a location of a set of eyes in an image.

11. The method of claim 8, further comprising panning the image capture device toward the person.

12. The method of claim 8, wherein the person is a a video conference participant.

13. The method of claim 8, wherein the adjusting adjusts a location of a portion of a display device.

14. The method of claim 8, wherein the adjusting adjusts a location of a reflective element.

15. A non-transitory computer-readable medium embodying instructions that, when executed by a processor, perform operations comprising:
   analyzing one or more facial movements of a person captured by an image capture device to recognize that the person is speaking, and
   adjusting an orientation of an image capture device in response to the facial movement analysis recognizing that the person is speaking.

16. The non-transitory computer-readable medium of claim 15, wherein the operations further comprise determining the location of the person by analyzing audio received by one or more microphones.

17. The non-transitory computer-readable medium of claim 15, wherein the operations further comprise determining the location of the person based on a location of a set of eyes in an image.

18. The non-transitory computer-readable medium of claim 15, the operations further comprising panning the image capture device toward the person.

19. The non-transitory computer-readable medium of claim 15, wherein the person is a video conference participant.

20. The non-transitory computer-readable medium of claim 15, wherein the adjusting operation adjusts a location of a reflective element.

* * * * *